United States Patent [19]

Kamiya

[11] Patent Number: 6,034,751
[45] Date of Patent: *Mar. 7, 2000

[54] ELASTICALLY DEFORMED RETAINING MEMBERS WITHIN RETAINING STRUCTURE OF LCD PANEL FOR ELECTRONIC EQUIPMENT

[75] Inventor: Shinichi Kamiya, Shizuoka, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/838,024

[22] Filed: Apr. 22, 1997

[30] Foreign Application Priority Data

Apr. 23, 1996 [JP] Japan .................................. 8-101160

[51] Int. Cl.⁷ ............................. G02F 1/1333; H05K 5/00
[52] U.S. Cl. .............................. 349/60; 349/58; 361/681; 361/679
[58] Field of Search .................... 349/60, 58; 361/681, 361/679

[56] References Cited

U.S. PATENT DOCUMENTS

| | | | |
|---|---|---|---|
| 3,718,842 | 2/1973 | Abbott et al. | 349/60 |
| 4,012,117 | 3/1977 | Lazzery | 349/60 |
| 4,247,928 | 1/1981 | Dorfman | 350/345 |
| 4,422,728 | 12/1983 | Andreaggi | 349/60 |
| 5,002,368 | 3/1991 | Anglin | 349/60 |
| 5,274,486 | 12/1993 | Yamazaki et al. | 349/58 |
| 5,867,235 | 2/1999 | Hasegawa | 349/58 |

FOREIGN PATENT DOCUMENTS

| | | |
|---|---|---|
| 55-65276 | 5/1980 | Japan . |
| 58-62378 | 4/1983 | Japan . |
| 2-85880 | 3/1990 | Japan . |
| 3-47586 | 5/1991 | Japan . |
| 4-28620 | 3/1992 | Japan . |
| 4-28686 | 3/1992 | Japan . |

OTHER PUBLICATIONS

Japanese Office Action dated Jul. 21, 1998 with English Language translation of Japanese Examiner's comments.

*Primary Examiner*—William L. Sikes
*Assistant Examiner*—Kari M. Horney
*Attorney, Agent, or Firm*—Whitham, Curtis & Whitham

[57] ABSTRACT

A retaining structure of an LCD panel on a mounting frame is provided, which is able to absorb an applied shock while retaining the panel detachably. This structure includes a mounting frame (#2) for mounting an LCD panel (#1) thereon. The frame has a mounting surface (2b) and supporting members (#2a) provided at respective corners of the mounting surface. The frame further has a pair of retaining members (#4a) formed at a pair of opposing ends of the frame, respectively. The pair of retaining members are able to elastically deformed by an applied external force. An LCD panel is engaged with the pair of retaining members in such a way that the pair of retaining members are elastically deformed by the LCD panel, thereby retaining the LCD panel by an elastic force generated by the pair of retaining members. The retained LCD panel is apart from the supporting members of the mounting frame by recesses (#2c) formed in the mounting frame.

12 Claims, 8 Drawing Sheets

ELASTICALLY DEFORMED RETAINING MEMBERS WITHIN RETAINING STRUCTURE OF LCD PANEL FOR ELECTRONIC EQUIPMENT

BACKGROUND OF THE INVENTION

1. Field of the Invention

The present invention relates to a retaining structure of a Liquid Crystal Display (LCD) panel and more particularly, to a retaining structure of an LCD panel used for electronic equipment on a mounting frame, which is able to absorb an applied shock while retaining the panel detachably.

2. Description of the Prior Art

FIG. 1 is an exploded diagram showing a conventional retaining structure of an LCD panel on a mounting frame.

In FIG. 1, an LCD panel 101 has a shape of an approximately rectangular plate. The panel 101 typically includes a pair of glass substrates (not shown), a spacer (not shown) located between the pair of substrates, and a liquid crystal (not shown) sandwiched between the pair of substrates. One of the pair of substrates usually has a set of pixel electrodes (not shown) and a plurality of switching transistors (not shown) arranged in a matrix array. Another of the pair of substrates usually has a set of common electrodes (not shown) and a color filter (not shown). The liquid crystal is sealed by the pair of substrates and the spacer.

A mounting frame 112 has a shape of a rectangular plate, which corresponds to the shape of the LCD unit 101. The frame 112 has a rectangular mounting surface 112b and four supporting members 112a fixed to the frame 112 at the respective corners of the surface 112b. The supporting members 112a protrude upward from the mounting surface 112b. Each of the members 112a has an L-shaped plan shape and covers a corresponding one of the corners of the frame 112.

A The frame 112 may be formed by an opaque synthetic-resin plate or a transparent synthetic-resin plate allowing to serve as a light-guiding plate for back light illumination to the LCD panel 101.

A Printed Wiring Board (PWB) 103 has a rectangular shape, which is larger than that of the LCD unit 101 and the mounting frame 112. The PWB 103 includes a controller circuitry (not shown) for controlling the LCD panel 101.

The LCD panel 101 is placed on the mounting surface 112b of the mounting frame 112. The panel 101 is simply placed onto the surface 112b and is not fixed thereonto. The panel 101, which is kept horizontally, is vertically inserted along the four supporting members 112a.

The height of the members 112a from the mounting surface 112b is larger than the total thickness of the LCD panel 101 and therefore, the top of the panel 101 is lower than the tops of the supporting members 112a when the panel 101 is placed on the mounting surface 112b. This height difference prevents an external pressure from being applied to the panel 101.

The combination of the mounting frame 112 and the LCD panel 101 mounted thereon is fixed onto a rectangular mounting surface 103b of the PWB 103 by a popular means. An opposite, lower surface to the mounting surface 112b of the frame 112 is contacted with the mounting surface 103b of the PWB 103.

With the conventional retaining structure of the LCD panel 101 shown in FIG. 1, the panel 101 is simply inserted into the rectangular space defined by the four supporting members 112a, and is not fixed onto the mounting frame 112. Therefore, the LCD panel 101 tends to be separated from the mounting frame 112 when the subsystem formed by the LCD panel 101, the mounting frame 112, and the PWB 103 is built or incorporated into a casing or envelope (not shown).

As a result, there is a problem that the building/incorporating operation or work for the subsystem is difficult to be performed.

Further, when the LCD panel 101 is applied with a shock due to falling and/or impact of the subsystem, the panel 101 tends to collide with some of the supporting members 112a. This causes another problem that the panel 101 is readily damaged and/or broken.

FIG. 2 is an exploded diagram showing another conventional retaining structure of an LCD panel on a mounting frame, in which an adhesive layer 104 is additionally provided between the LCD panel 101 and the mounting frame 112.

The panel 101 is fixed onto the mounting surface 112b of the frame 112 by the adhesive layer 104, thereby preventing the panel 101 from being shifted with respect to the frame 112 and being separated from the frame 112.

With the conventional retaining structure of the LLCD panel 101 shown in FIG. 2, since the LCD panel 101 is fixed onto the mounting frame 112 by the adhesive layer 104, the shift and separation of the LCD panel 101 are able to be prevented during the building or incorporating operation of the subsystem.

However, in this case, there is a problem that the LCD panel 101 is unable to be replaced with another one even if some error takes place in the panel 101.

Additionally, when the mounting frame 112 has a function of a light-guiding plate for back light illumination, there arises a problem that some brightness unevenness of the back light tends to occur due to the adhesive layer 104.

SUMMARY OF THE INVENTION

Accordingly, an object of the present invention is to provide a retaining structure of an LCD panel on a mounting frame that is able to absorb an applied shock while retaining the panel detachably.

Another object of the present invention is to provide a retaining structure of an LCD panel on a mounting frame that is able to facilitate the building or incorporating operation of the panel.

The above objects together with others not specifically mentioned will become clear to those skilled in the art from the following description.

In a retaining structure of an LCD panel on a mounting frame according to the present invention, the mounting frame has a mounting surface and supporting members provided at respective corners of the mounting surface. The frame further has a pair of retaining members formed at a pair of opposing ends of the frame, respectively. Each of the pair of retaining members is able to elastically deformed by an applied external force.

The LCD panel is engaged with the pair of retaining members in such a way that the LCD panel is sandwiched between the pair of retaining members and that the LCD panel elastically deforms the pair of retaining members.

The LCD panel is retained by the application of elastic forces generated by the pair of retaining members. The retained LCD panel is apart from the supporting members of the mounting frame.

With the retaining structure according to the present invention, the mounting frame has a pair of elastically deformable retaining members formed at a pair of opposing ends of the frame, respectively. An LCD panel is engaged with the pair of retaining members in such a way that the LCD panel is sandwiched between the pair of retaining members and that the LCD panel elastically deforms the pair of retaining members. The retained LCD panel is apart from the supporting members of the frame.

Accordingly, an applied shock to the frame is able to be absorbed and at the same time, the LCD panel is able to be detachably retained.

Also, the LCD panel is simply retained by engaging the panel with the pair of retaining members against the elastic forces generated by the pair of retaining members. As a result, the building or incorporating operation of the panel is able to be facilitated.

In the retaining structure according to the present invention, it is preferred that the mounting frame has a function of a light-guiding plate for back light illumination.

In a preferred embodiment of the structure according to the present invention, each of the pair of retaining members has an L-shaped cross section. The pair of retaining members are elastically deformed outwardly by inserting the LCD panel between the pair of retaining members, respectively, thereby generating pressing forces. The LCD panel is engaged with the pair of retaining members under the application of the pressing forces.

In this case, there is an additional advantage that the retaining structure is able to be simply realized, and that the retaining operation is able to be readily performed.

In another preferred embodiment of the retaining structure according to the present invention, another pair of retaining members, each of which has an L-shaped cross section, are formed at another pair of opposing ends of the frame.

In this case, the LCD panel is retained more strongly than the case where another pair of retaining members are not additionally provided.

In still another preferred embodiment of the retaining structure according to the present invention, each of the pair of retaining members has a U-shaped cross section. The pair of retaining members are elastically deformed outward by inserting the LCD panel between the pair of retaining members, respectively, thereby engaging ends of the pair of retaining members with the LCD panel. The LCD panel is retained by the engagement of the pair of retaining members.

In this case, there is an additional advantage that the retained LCD panel is difficult to be separated from the LCD panel, because the panel is hooked by the pair of U-shaped retaining members.

BRIEF DESCRIPTION OF THE DRAWINGS

In order that the invention may be readily carried into effect, it will now be described with reference to the accompanying drawings.

DETAILED DESCRIPTION OF THE PREFERRED EMBODIMENTS

Figure 1:
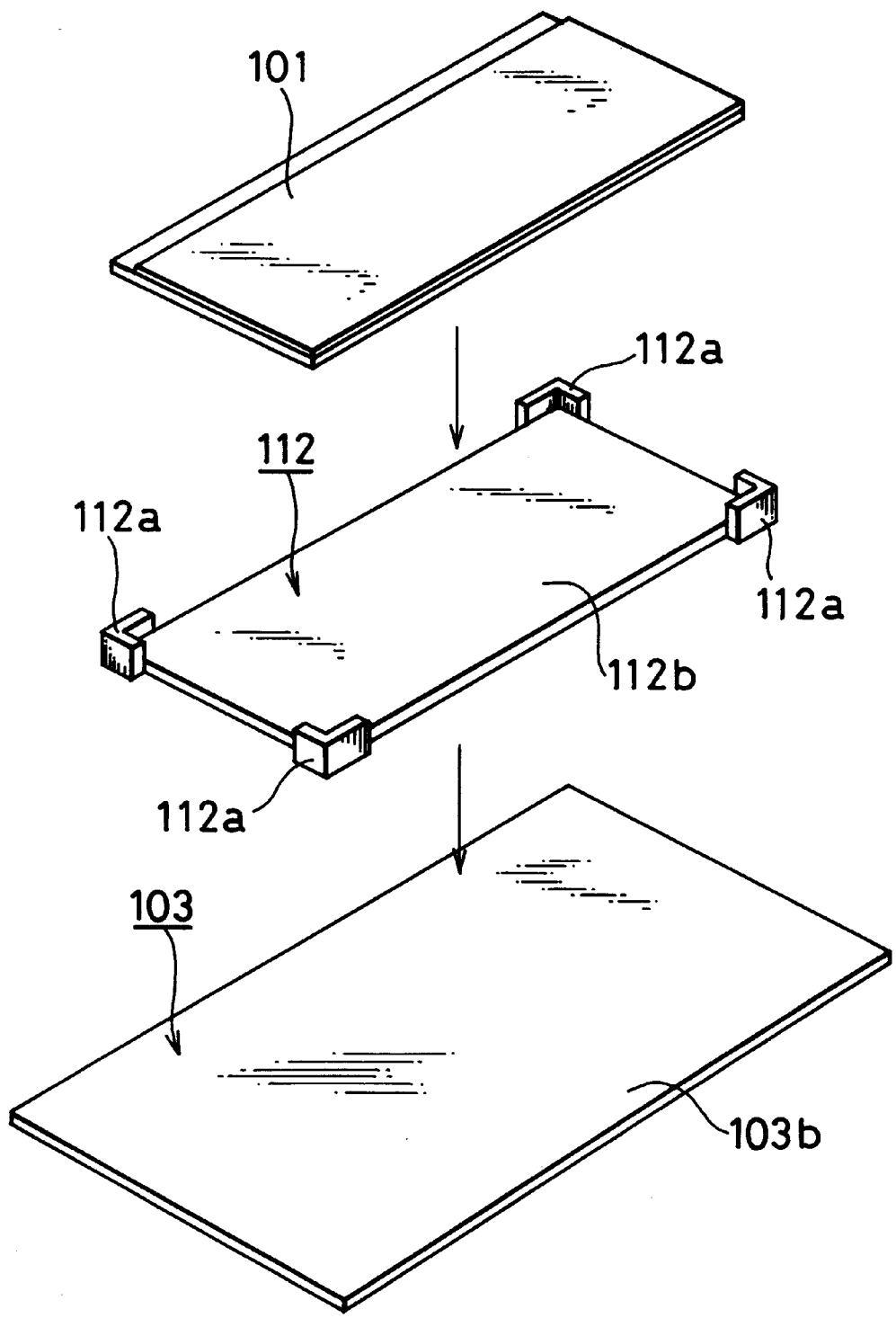
FIG. 1 is an exploded diagram showing a conventional retaining structure of an LCD panel on a mounting frame.
Figure 2:
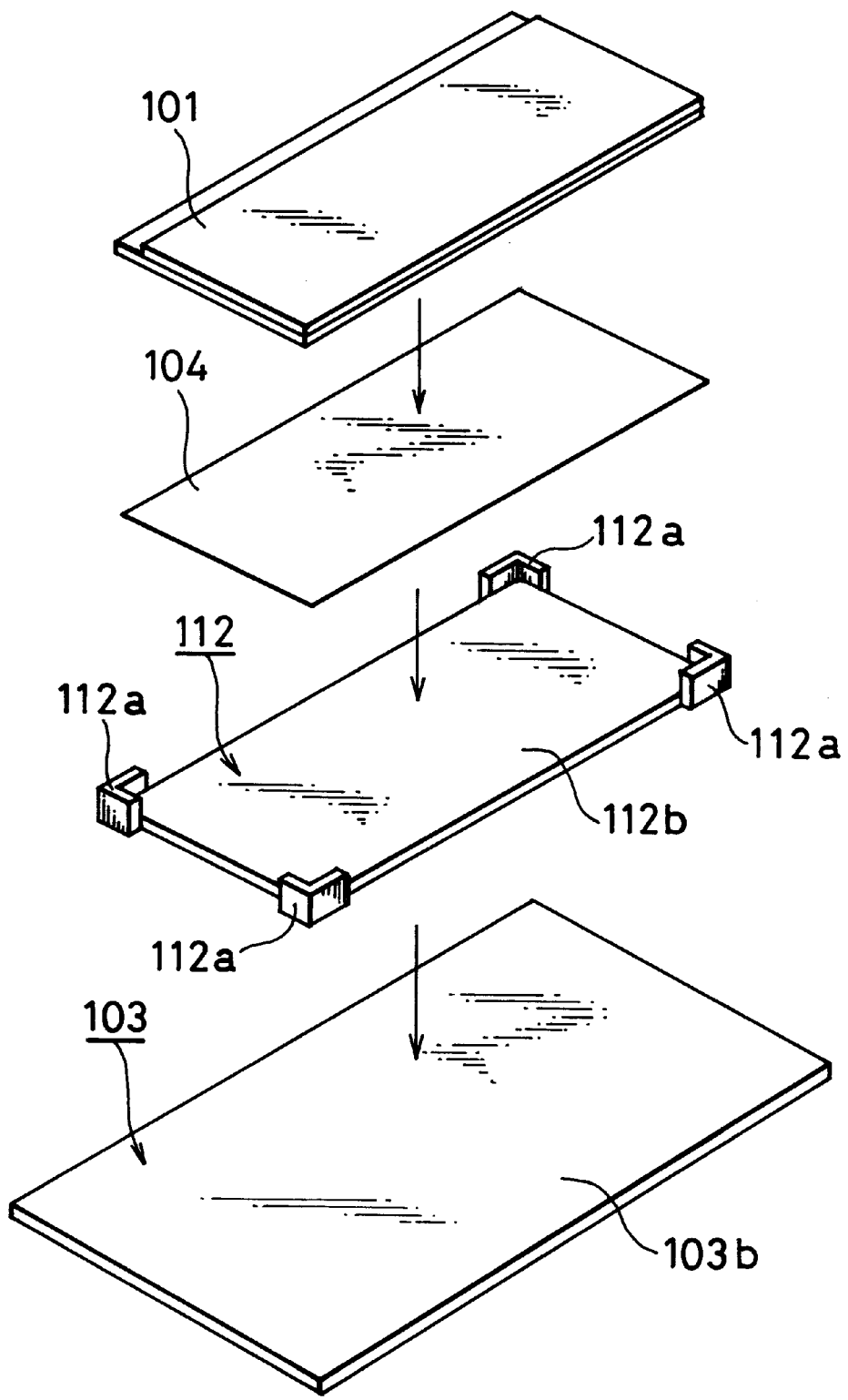
FIG. 2 is an exploded diagram showing another conventional retaining structure of an LCD panel on a mounting frame.

Preferred embodiments of the present invention will be described below referring to the drawings attached.

First Embodiment

Figure 3:
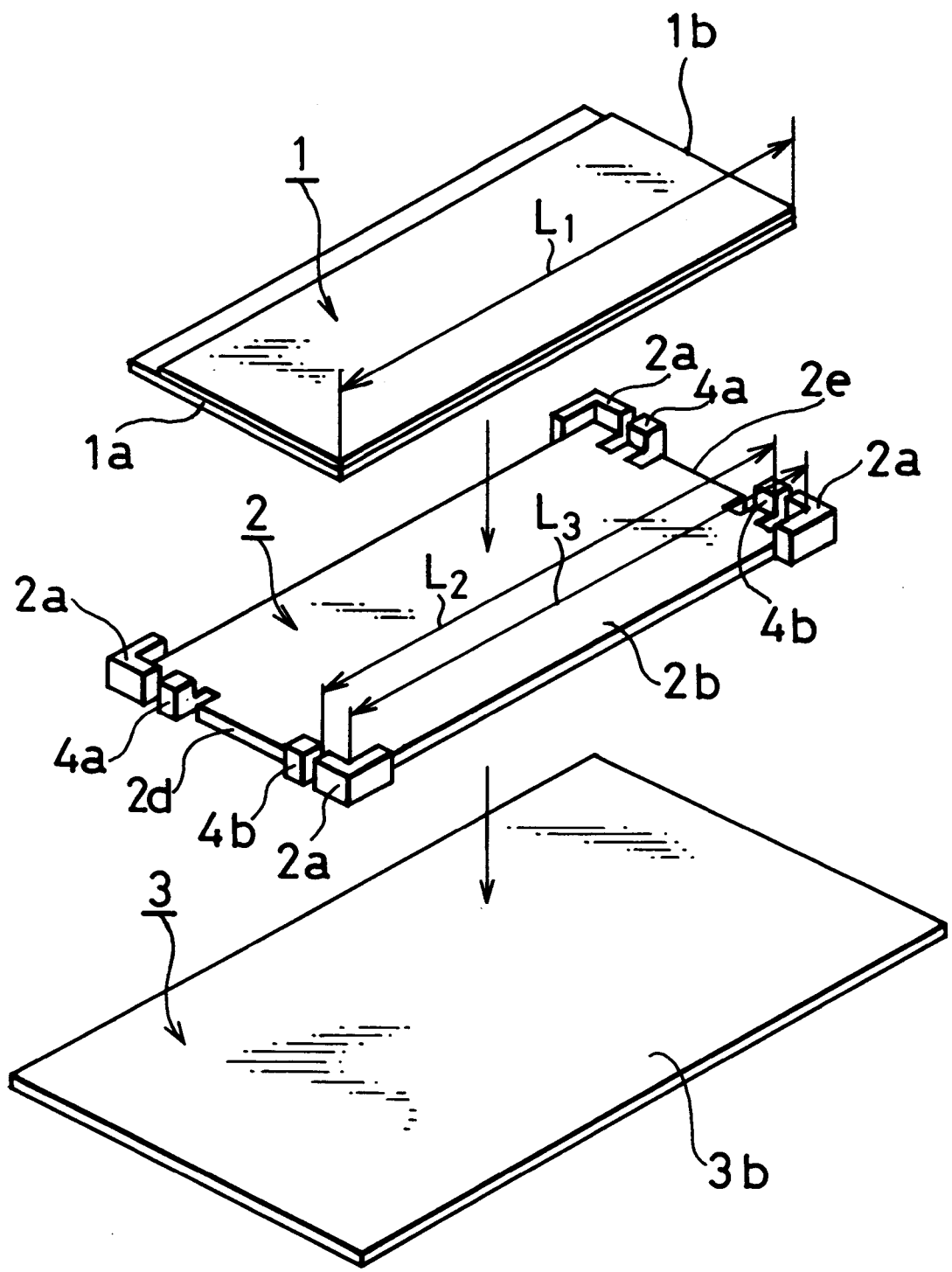
FIG. 3 is an exploded diagram showing a retaining structure of an LCD panel on a mounting frame according to a first embodiment of the present invention.
Figure 4:
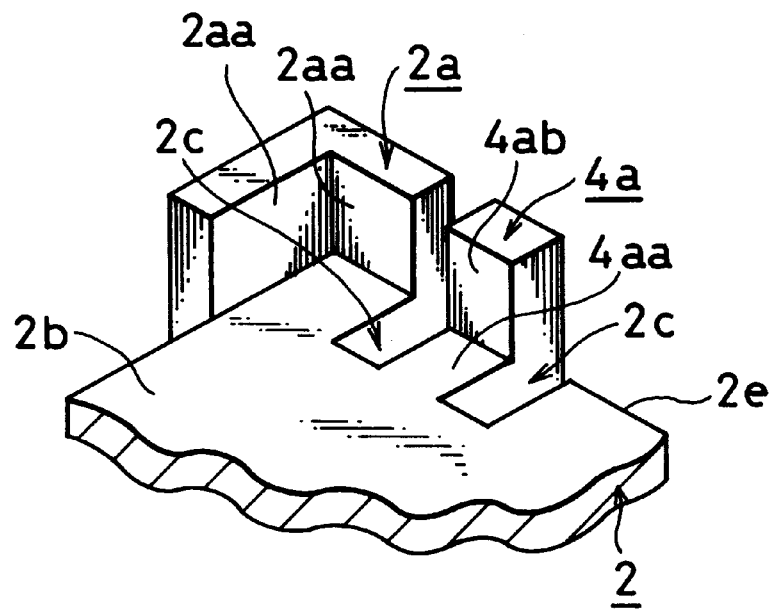
FIG. 4 is a partial, enlarged, perspective view showing the L-shaped retaining member in the retaining structure according to the first embodiment of FIG. 3.
Figure 5:
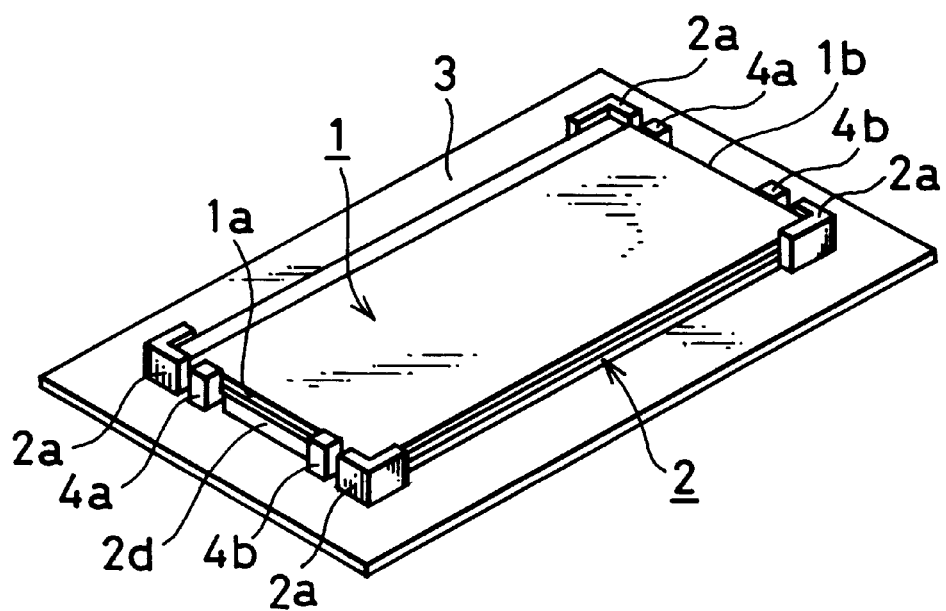
FIG. 5 is a perspective view of the retaining structure according to the first embodiment of FIG. 3.

A retaining structure of an LCD panel on a mounting frame according to a first embodiment is shown in FIGS. 3, 4, and 5.

As shown in FIG. 3, an LCD panel 1 has a shape of an approximately rectangular plate. The typically configuration of the panel 1 is the same as that of the previously-explained conventional retaining structure shown in FIG. 1.

A mounting frame 2 has a shape of a rectangular plate, which corresponds to the shape of the LCD unit 1. The frame 2 has a rectangular, flat mounting surface 2b and four supporting members 2a fixed to the frame 2 at the respective corners of the surface 2b. The supporting members 2a protrude upward from the mounting surface 2b. Each of the members 2a has an L-shaped plan shape and covers a corresponding one of the corners of the frame 2.

The frame 2 further has two pairs of retaining members 4a and 4b formed at a pair of opposing ends 2d and 2e of the frame 2, respectively. In other words, the two retaining members 4a and 4b are provided at the end 2d, and the two remaining retaining members 4a and 4b are provided at the end 2e.

As shown in FIG. 4, each of the retaining members 4a and 4b has an L-shaped cross section with two arms 4aa and 4ab bent at a right angle. The arm 4aa is parallel to the mounting surface 2b of the mounting frame 2. The arm 4ab is perpendicular to the mounting surface 2b. To allow the members 4a and 4b to be elastically deformed, two recesses 2a are formed in the frame 2 at both sides of the arm 4aa. The recess 2c near the corresponding supporting member 2a vertically extends to the top of the supporting member 2a. The top of the supporting member 2a is substantially in the same plane as that of the retaining member 4a.

The retaining member 4b has the same configuration as that of the retaining member 4a.

As shown in FIG. 3, the distance $L_2$ between the opposing inner faces of the pair of retaining members 4a and 4b is slightly shorter than the length $L_1$ (i.e., the distance between the opposite ends 1a and 1b) of the LCD panel 1. The distance $L_3$ between the opposing inner faces of the corresponding supporting members 2a is slightly longer than the length $L_1$. Therefore, $L_2 < L_1 < L_3$.

Since the recesses 2c are formed, each of the retaining members 4a and 4b is able to be elastically deformed outwardly if an external force is applied thereto. Therefore, by inserting the LCD panel 1 between the pairs of retaining members 4a and 4b, respectively, the retaining members 4a and 4b are elastically deformed outwardly.

Thus, each of the members 4a and 4b applies a pressing force to the end 2d or 2e of the frame 2. As a result, the LCD panel 1 is engaged by the two pairs of retaining members 4a and 4b under the application of the pressing forces. The retained LCD panel 1 is apart from the supporting members 2a of the mounting frame 2.

Here, the frame 2 is formed by a transparent synthetic-resin plate serving as a light-guiding plate for back light illumination to the LCD panel 1. However, it is needless to say that the frame 2 may be simply formed by an opaque synthetic-resin plate.

A PWB 3 has a rectangular shape, which is larger than that of the LCD unit 1 and the mounting frame 2. The PWB 3 includes a controller circuitry (not shown) for controlling the LCD panel 1.

With the retaining structure according to the first embodiment, the mounting frame 2 has the two pairs of elastically deformable retaining members 4a and 4b formed at the pair of opposing ends 2d and 2e of the frame 2, respectively. The LCD panel 1 is engaged with the pairs of retaining members 4a and 4b in such a way that the pairs of retaining members 4a and 4b are elastically deformed by the LCD panel 1 and that the retained LCD panel 1 is apart from the supporting members 2a of the frame 2.

Accordingly, an applied shock to the frame 2 is able to be absorbed and at the same time, the LCD panel 1 is able to be detachably retained.

Also, the LCD panel 1 is simply retained by engaging the panel 1 with the two pairs of retaining members 4a and 4b against the elastic forces generated by the pairs of retaining members 4a and 4b. As a result, the building or incorporating operation of the panel 1 is able to be facilitated.

Second Embodiment

Figure 6:
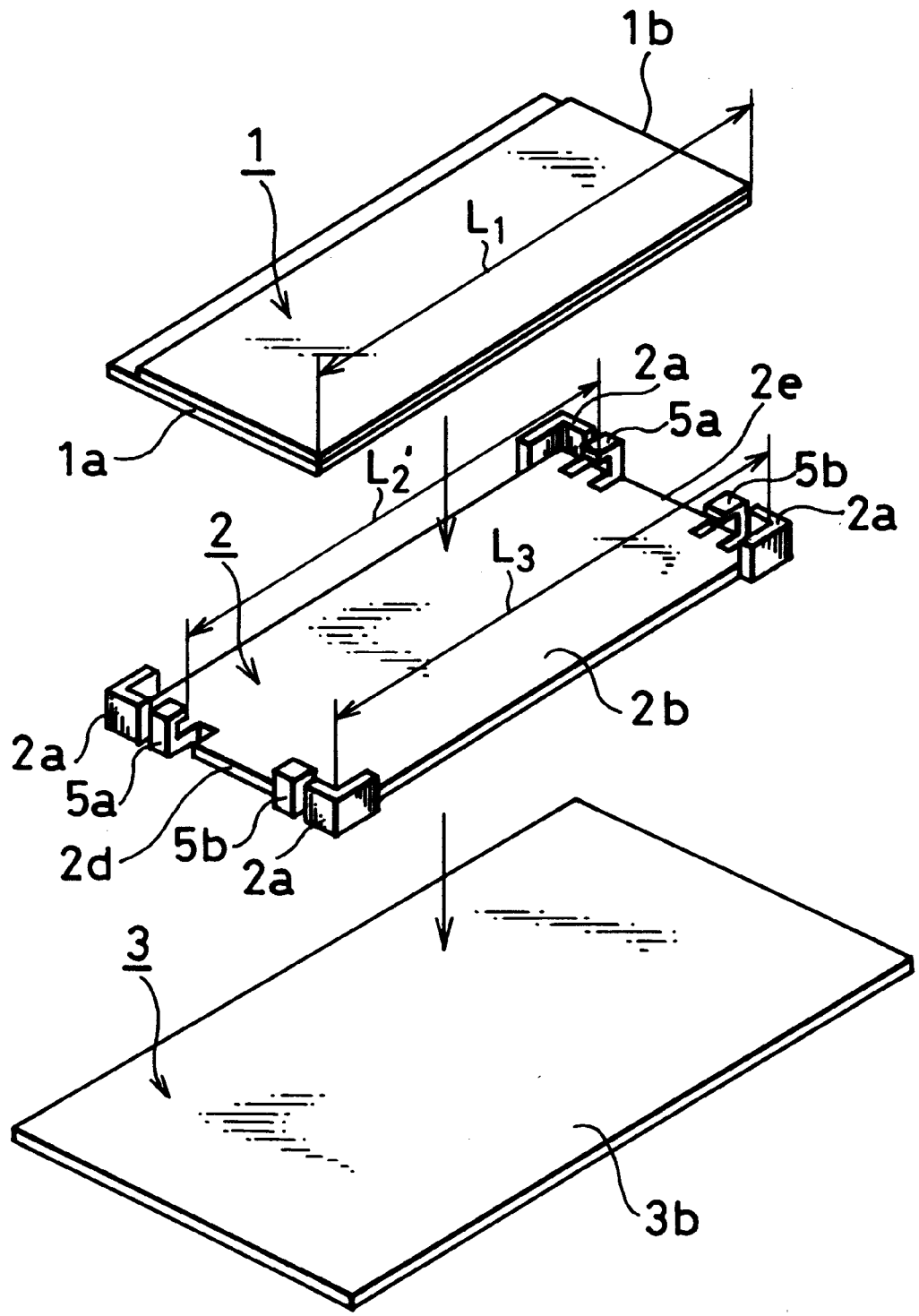
FIG. 6 is an exploded diagram showing a retaining structure of an LCD panel on a mounting frame according to a second embodiment of the present invention.
Figure 7:
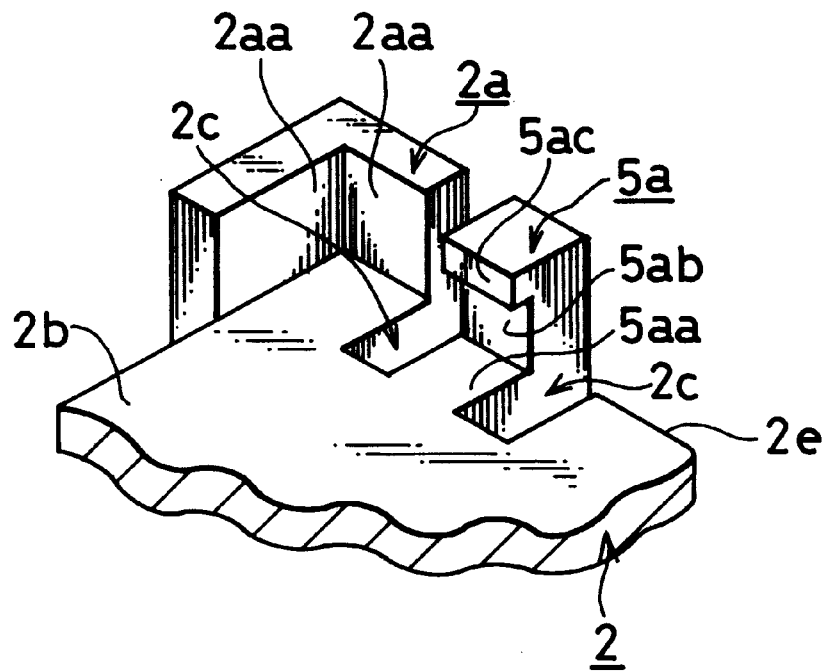
FIG. 7 is a partial, enlarged, perspective view showing the U-shaped retaining member in the retaining structure according to the second embodiment of FIG. 6.
Figure 8:
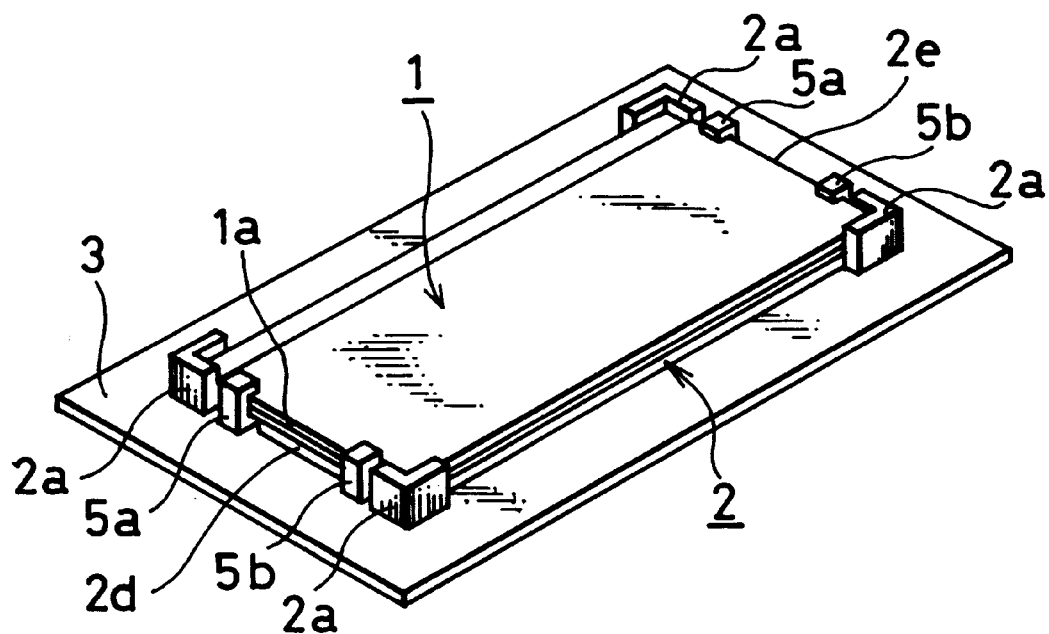
FIG. 8 is a perspective view of the retaining structure according to the second embodiment of FIG. 6.

A retaining structure of an LCD panel on a mounting frame according to a second embodiment is shown in FIGS. 6, 7, and 8.

As seen from FIGS. 6, 7, and 8, the retaining structure according to the second embodiment is the same as that of the first embodiment except that two pairs of retaining members 5a and 5b are provided instead of the two pairs of retaining members 4a and 4b in the first embodiment.

Therefore, the description relating to the same configuration is omitted here by adding the same reference numerals as those in the retaining structure of FIGS. 3, 4, and 5 for the sake of simplification of description.

In the retaining structure according to the second embodiment, as shown in FIG. 7, each of the retaining members 5a and 5b has a U-shaped cross section.

Specifically, each of the retaining members 5a and 5b has a U-shaped cross section with three arms 5aa, 5ab, and 5ac, each of which is bent at a right angle. The arms 5aa and 5ac are parallel to the mounting surface 2b of the mounting frame 2. The arm 5ab is perpendicular to the mounting surface 2a. Two recesses 2c are formed in the frame 2 at both sides of the arm 5aa.

The retaining member 5b has the same configuration as that of the retaining member 5a.

The relationship among the length $L_1$, the distance $L_2'$ between the opposing inner faces of the corresponding supporting members 5a or 5b is slightly shorter than the length $L_1$. The distance $L_3$ is the same as that of the first embodiment. Therefore, $L_2' < L_1 < L_3$.

With the retaining structure according to the second embodiment, each of the members 5a and 5b has the top arm 5ac protruding inwardly from the middle arm 5ab. Therefore, when the LCD unit 1 is inserted between the two pairs of the retaining members 5a and 5b, each of the retaining members 5a and 5b is able to be elastically deformed outwardly.

Thus, each of the members 5a and 5b applies a pressing force to the end 2d or 2e of the frame 2. As a result, the LCD panel 1 is engaged by the two pairs of retaining members 5a and 5b under the application of the pressing forces. The retained LCD panel 1 is apart from the supporting members 2a of the mounting frame 2.

Third Embodiment

Figure 9:
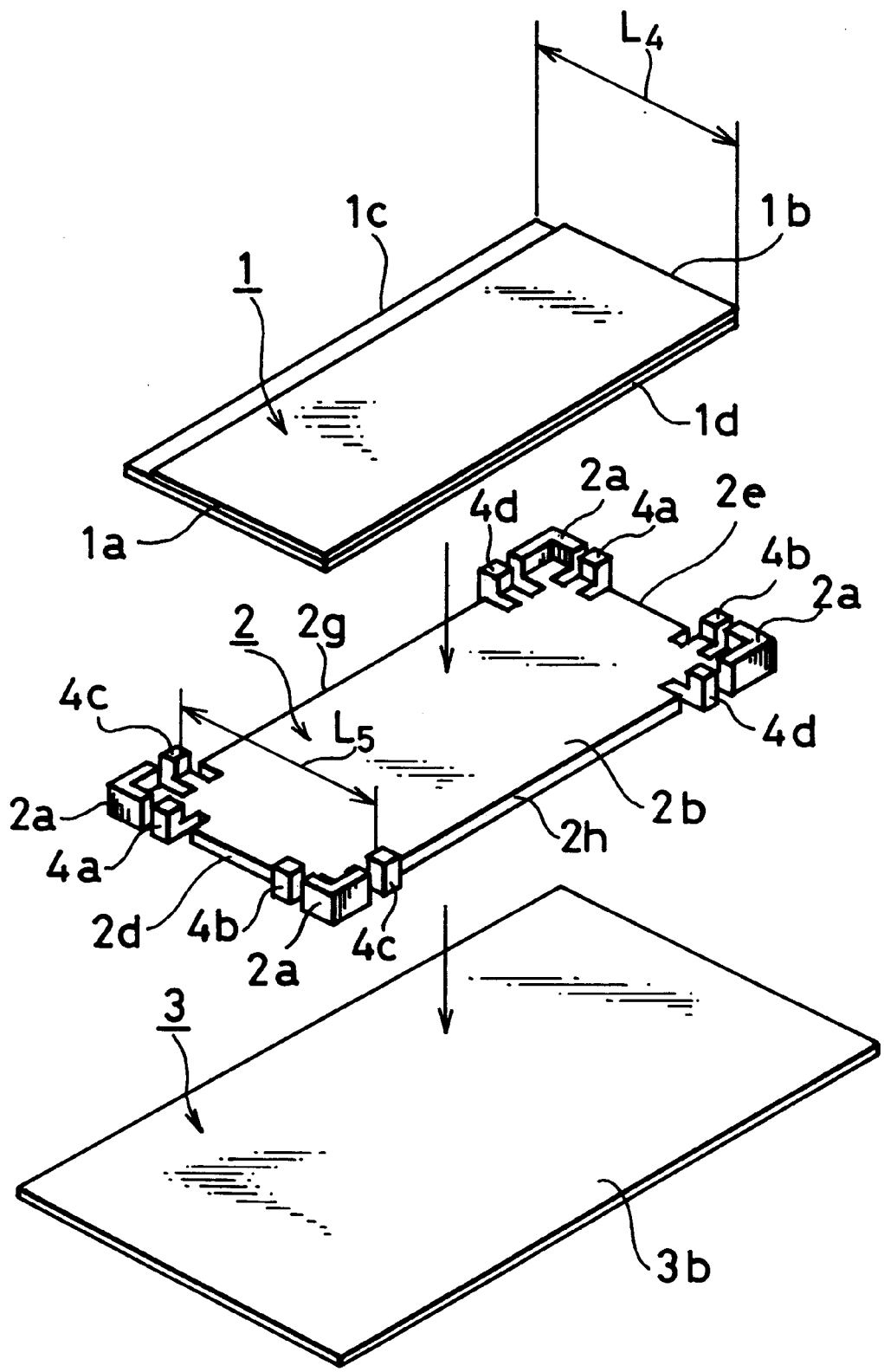
FIG. 9 is an exploded diagram showing a retaining structure of an LCD panel on a mounting frame according to a third embodiment of the present invention.
Figure 10:
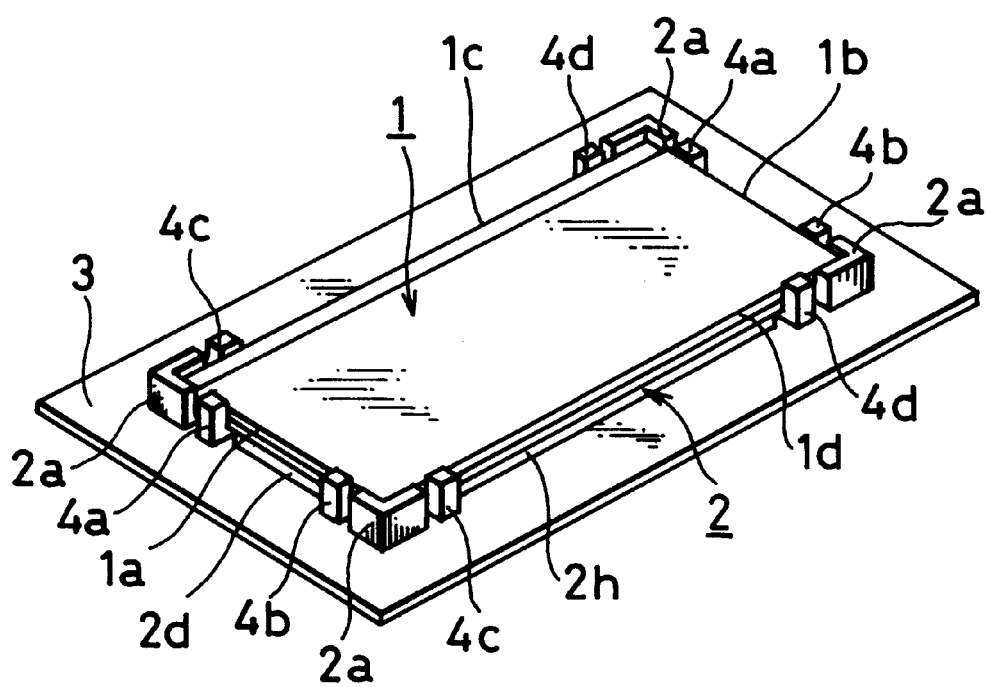
FIG. 10 is a perspective view of the retaining structure according to the third embodiment of FIG. 9.

A retaining structure of an LCD panel on a mounting frame according to a third embodiment is shown in FIGS. 9 and 10.

As seen from FIGS. 9 and 10, the retaining structure according to the third embodiment is the same as that of the first embodiment except that two pairs of retaining members 4c and 4d are additionally provided at the remaining opposite ends 2g and 2h of the mounting frame 2.

Therefore, the description relating to the same configuration is omitted here by adding the same reference numerals as those in the retaining structure of FIGS. 3, 4, and 5.

The retaining member 5b has the same configuration as that of the retaining member 5a.

The relationship among the length $L_1$, the distance $L_2$, and the distance $L_3$ is the same as that of the first embodiment.

The distance $L_5$ between the opposing inner faces of the pair of retaining members 4c and 4d is slightly shorter than the length $L_4$ (i.e., the distance between the opposite ends 1c and 1d) of the LCD panel 1.

With the retaining structure according to the third embodiment, the mounting frame 2 has two pairs of elastically deformable retaining members 4a and 4b formed at the pair of opposing ends 2d and 2e of the frame 2 and two pairs of elastically deformable retaining members 4c and 4d formed at the pair of opposing ends 2g and 2h thereof, respectively. The LCD panel 1 is engaged with the four pairs of retaining members 4a, 4b, 4c, and 4d in such a way that the pairs of retaining members 4a, 4b, 4c, and 4d are elastically deformed by the LCD panel 1 and that the retained LCD panel 1 is apart from the supporting members 2a of the frame 2.

Accordingly, an applied shock to the frame 2 is able to be absorbed and at the same time, the LCD panel 1 is able to be detachably retained.

Also, the LCD panel 1 is simply retained by engaging the panel 1 with the two pairs of retaining members 4a, 4b, 4c, and 4d against the elastic forces generated by the pairs of retaining members 4a, 4b, 4c, and 4d. As a result, the building or incorporating operation of the panel 1 is able to be facilitated.

The shape and number of the retaining members described in the above first to third embodiments examples, and therefore, any other shape and any other number may be applied to the present invention.

While the preferred forms of the present invention has been described, it is to be understood that modifications will be apparent to those skilled in the art without departing from the spirit of the invention. The scope of the invention, therefore, is to be determined solely by the following claims.

What is claimed is:

1. A retaining structure of an LCD panel, said structure comprising
   (a) a mounting frame comprising:
      a mounting surface and supporting members provided at respective corners of said mounting surface, said supporting members extending upward from said mounting surface;
      a pair of retaining members formed at a pair of opposing ends of said mounting frame, respectively, each retaining member including a first arm substantially parallel with and extending outward from said mounting surface and a second arm extending substantially perpendicular to said mounting surface and extending from said first arm;
      a first recess formed in said mounting frame at a first side of said first arm of said each retaining member;
      a second recess at a second side of said first arm of said each retaining member and extending upward between said second arm of said each retaining member and said support member, said first and second recess enabling said pair of retaining members to be elastically deformed by an applied external force; and
   (b) an LCD panel comprising a back surface and edges;
      said back surface being substantially mounted on and contacting said mounting surface of said mounting frame; and
      said edges engaging said pair of retaining members such that said pair of retaining members are elastically deformed by said LCD panel when said LCD panel is mounted on said mounting surface of said mounting frame and applies the external force to said retaining members, thereby retaining said LCD panel by an elastic force generated by said pair of retaining members;
      said retained LCD panel being apart from said supporting members of said mounting frame.

2. The structure as claimed in claim 1, wherein said mounting frame has a function of a light-guiding plate for back light illumination.

3. The structure as claimed in claim 1, wherein:
   each of said pair of retaining members has an L-shaped cross section;
   said pair of retaining members are elastically deformed outwardly by inserting said LCD panel between said pair of retaining members, respectively, thereby generating a pressing force;
   and wherein said LCD panel is engaged by said pair of retaining members under the application of said pressing force.

4. The structure as claimed in claim 1, wherein;
   a distance between opposing inner surfaces of said retaining members is $L_2$,
   a distance between edges of said LCD panel along a length of said LCD panel is $L_1$, and
   a distance between opposing inner surfaces of said supporting members along a length of said mounting frame is $L_3$, where $L_2 < L_1 < L_3$.

5. The structure as claimed in claim 1, wherein each of said pair of retaining members has a U-shaped cross section;
   and wherein said pair of retaining members are elastically deformed outward by inserting said LCD panel between said pair of retaining members, respectively, thereby engaging ends of said pair of retaining members with said LCD panel;
   and wherein said LCD panel is retained by said engagement of said pair of retaining members.

6. The structure as claimed in claim 5, wherein:
   a distance between opposing inner surfaces of said retaining members is $L_2$,
   a distance between edges of said LCD panel along a length of said LCD panel is $L_1$, and
   a distance between opposing inner surfaces of said supporting members along a length of said mounting frame is $L_3$, where $L_2 < L_1 < L_3$.

7. The structure as claimed in claim 1, further comprising an additional pair of retaining members;
   wherein each of said additional pair of retaining members has an L-shaped cross section;
   and wherein said additional pair of retaining members are formed at another pair of opposing ends of said frame.

8. The structure as claimed in claim 7, wherein:
   a distance between inner surfaces of said additional pair of retaining members is $L_5$, and
   a distance between edges of said LCD panel along a width portion is $L_4$, where $L_5 < L_4$.

9. The structure as claimed in claim 8, wherein:
   a distance between opposing inner surfaces of said retaining members is $L_2$,
   a distance between edges of said LCD panel along a length of said LCD panel is $L_1$, and
   a distance between opposing inner surfaces of said supporting members along a length of said mounting frame is $L_3$, where $L_2 < L_1 < L_3$.

10. The structure as claimed in claim 1, wherein said pair of retaining members are integral with said mounting frame.

11. A retaining structure of an LCD panel, said structure comprising:
    a mounting frame comprising:
       a mounting surface and supporting members provided at respective corners of said mounting surface;
       a pair of elastically deformed retaining members formed at opposing ends of said frame, respectively; and
       recesses formed in said mounting frame at opposing sides of each retaining member, wherein at least two of said recesses formed at each opposing ends of said frame extend upward between a side of said supporting members and a side of an upward extending arm of said pair of elastically deformed retaining members; and
    an LCD panel mounted on said mounting surface of said mounting frame, said LCD panel bearing against said elastically deformed retaining members when said LCD panel is mounted on said mounting surface, said pair of retaining members elastically deforming by said LCD panel thereby retaining said LCD panel by an elastic force generated by said pair of retaining members;
    said retained LCD panel being apart from said supporting members of said mounting frame.

12. The structure as claimed in claim 11, wherein:
    a distance between opposing inner surfaces of said retaining members is $L_2$,
    a distance between edges of said LCD panel along a length of said LCD panel is $L_1$, and
    a distance between opposing inner surfaces of said supporting members along a length of said mounting frame is $L_3$, where $L_2 < L_1 < L_3$.

* * * * *